(12) United States Patent
Zhou

(10) Patent No.: US 9,475,271 B2
(45) Date of Patent: Oct. 25, 2016

(54) PEELING MECHANISM AND PEELING METHOD USING THE SAME

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Tao Zhou, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 161 days.

(21) Appl. No.: 14/509,073

(22) Filed: Oct. 8, 2014

(65) Prior Publication Data
US 2015/0096691 A1   Apr. 9, 2015

(30) Foreign Application Priority Data

Oct. 8, 2013   (CN) .......................... 2013 1 0463179

(51) Int. Cl.
*B32B 43/00*   (2006.01)
*B29C 63/00*   (2006.01)

(52) U.S. Cl.
CPC ......... *B32B 43/006* (2013.01); *B29C 63/0013* (2013.01); *Y10T 156/1168* (2015.01); *Y10T 156/1184* (2015.01); *Y10T 156/1967* (2015.01); *Y10T 156/1978* (2015.01); *Y10T 156/1989* (2015.01)

(58) Field of Classification Search
CPC ................ B32B 38/10; B32B 43/006; Y10T 156/1132; Y10T 156/1168; Y10T 156/1184; Y10T 156/1944; Y10T 156/1961; Y10T 156/1967; Y10T 156/1978; Y10T 156/1989; Y10T 83/6563; Y10T 83/6564; Y10T 83/6566
See application file for complete search history.

(56) References Cited

U.S. PATENT DOCUMENTS

| | | | | |
|---|---|---|---|---|
| 3,076,367 A | * | 2/1963 | Leibinger ............... | B21D 43/04 226/166 |
| 4,177,104 A | * | 12/1979 | Parker ................. | B29C 63/0013 156/764 |
| 5,282,918 A | * | 2/1994 | Heist ...................... | B26D 3/282 156/765 |
| 5,538,591 A | * | 7/1996 | Collins .................... | B26D 3/28 156/715 |

(Continued)

FOREIGN PATENT DOCUMENTS

| BE | EP 2286990 A1 * | 2/2011 | ........... B32B 43/006 |
|---|---|---|---|
| CN | 102241180 A | 11/2011 | |

(Continued)

*Primary Examiner* — Mark A Osele
(74) *Attorney, Agent, or Firm* — Zhigang Ma

(57) ABSTRACT

A peeling mechanism configured to cooperate with a mechanical arm to remove a protecting film from a workpiece can include a driver, two clamping members coupled to the driver and spaced from each other, and two cutting members respectively coupled to the clamping members oppositely to each other. Each cutting member can include a protruding end extending towards the other cutting member. The protruding end protrudes out of the clamping member. The driver can be configured to move the two clamping members towards each other.

9 Claims, 8 Drawing Sheets

(56) References Cited

U.S. PATENT DOCUMENTS

| | | | | |
|---|---|---|---|---|
| 5,656,127 A * | 8/1997 | De Niel | ............ | B29C 63/0013 156/714 |
| 6,227,276 B1 * | 5/2001 | Kim | .................. | B29C 63/0013 156/247 |
| 8,756,783 B2 * | 6/2014 | Lu | ....................... | G02F 1/1303 156/247 |
| 9,102,430 B2 * | 8/2015 | Monti | ................ | B65B 69/0033 |
| 2008/0245483 A1 * | 10/2008 | Toyoshima | .......... | B32B 43/006 156/763 |
| 2014/0238617 A1 * | 8/2014 | Shair | .................... | B32B 43/006 156/708 |
| 2015/0261206 A1 * | 9/2015 | Shiino | ................... | B25J 9/1694 700/257 |

FOREIGN PATENT DOCUMENTS

| | | | | |
|---|---|---|---|---|
| CN | 202107203 U | 1/2012 | | |
| JP | WO 2014083695 A1 * | 6/2014 | ........... | B25J 9/1694 |

* cited by examiner

US 9,475,271 B2

PEELING MECHANISM AND PEELING METHOD USING THE SAME

FIELD

The subject matter herein generally relates to peeling mechanisms and peeling methods.

BACKGROUND

A workpiece can be covered by a protecting film before being machined, and the protecting film should be removed away from the workpiece. A peeling machine can be used when peeling the protecting film.

BRIEF DESCRIPTION OF THE DRAWINGS

Implementations of the present technology will now be described, by way of example only, with reference to the attached figures.

DETAILED DESCRIPTION

Figure 1:
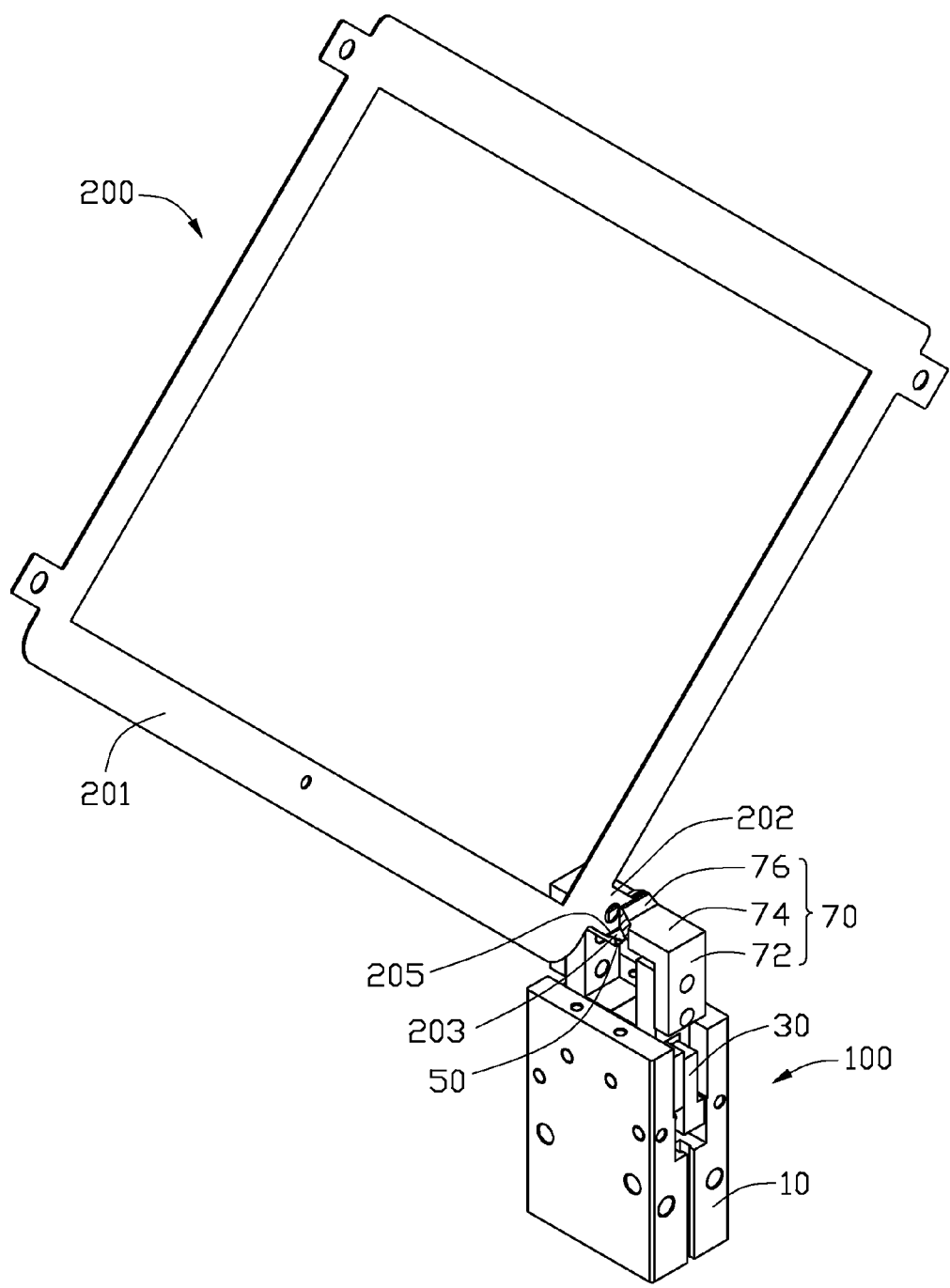
FIG. 1 is an isometric view of a first embodiment of a peeling mechanism in a first operation status.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A peeling mechanism can be configured to cooperate with a mechanical arm to remove a protecting film from a workpiece. The workpiece can include a main portion, a peeling portion forming on the main portion, and a peeling corner forming on the peeling portion. An indentation can be defined between the peeling portion and the peeling corner. The workpiece can be hold on the mechanical arm. The peeling mechanism can include a driver, two clamping members coupled to the driver, and two cutting members respectively coupled to the clamping members. The two clamping members can be spaced from each other. The two cutting members can be positioned oppositely of each other. Each cutting member can include a protruding end extending towards the other cutting member. The protruding end can protrude out of the clamping member. The driver can be configured to move the two clamping members towards each other and clamp the peeling portion. One of the two protruding ends can be configured to push the peeling corner, thus the peeling corner can be bent and broken off from the peeling portion about the indentation. The clamping members can be configured to clamp the peeling corner and the protecting film adhering on the peeling corner. The mechanical arm can be configured to move the main portion away from the peeling mechanism to remove the protecting film form the workpiece.

A peeling method can include the following procedures. A mechanical arm and a workbench can be provided. The mechanical arm can be positioned adjacent to the workbench. A peeling mechanism described above can be provided and positioned on the workbench. A workpiece with a protecting film adhering thereon can be provided. The workpiece can include a main portion, a peeling portion forming on the main portion, and a peeling corner forming on the peeling portion. An indentation can be defined between the peeling portion and the peeling corner. The workpiece can be mounted to the mechanical arm. The mechanical arm can move the workpiece to the peeling mechanism. The peeling portion can be positioned between the two resisting surfaces. The peeling corner can be corresponding to a protruding end, and the protruding end can push the peeling corner. Thus the peeling corner can be bent relatively to the peeling portion towards a first direction about the indentation. The mechanical arm can move the peeling corner to correspond to the other protruding end. The protruding end can push the peeling corner, thus the peeling corner can be bent and broken off from the peeling portion towards a second direction about the indentation. The mechanical arm can move the workpiece and the peeling corner can be positioned between the two clamping members. The two clamping members can clamp the peeling corner and the protecting film adhering on the peeling corner. And, the mechanical arm can move the workpiece away from the peeling mechanism, thereby the protecting film being removed from the workpiece.

Another peeling method can include the following procedures. A mechanical arm and a workbench can be provided. The mechanical arm can be positioned adjacent to the workbench. A peeling mechanism can be provided and positioned on the workbench. The peeling mechanism can include a driver and two clamping members coupled to the driver. The two clamping members can be spaced from each other. The driver can be configured to move the two clamping members towards or away from each other. A workpiece with a protecting film adhering thereon can be provided. The workpiece can include a main portion, a peeling portion forming on the main portion, and a peeling corner forming on the peeling portion, An indentation can be defined between the peeling portion and the peeling corner. The workpiece can be mounted to the mechanical arm. The mechanical arm can move the workpiece to the peeling mechanism. The peeling portion can be positioned between the two clamping members. The clamping members can clamp the peeling corner and the protecting film adhering on the peeling corner. The mechanical arm can rotate the workpiece about the indentation. The peeling corner can be bent and broken off from the peeling portion about the indentation. And, the mechanical arm can move the workpiece away from the peeling mechanism, thereby the protecting film being removed from the workpiece.

Figure 2:
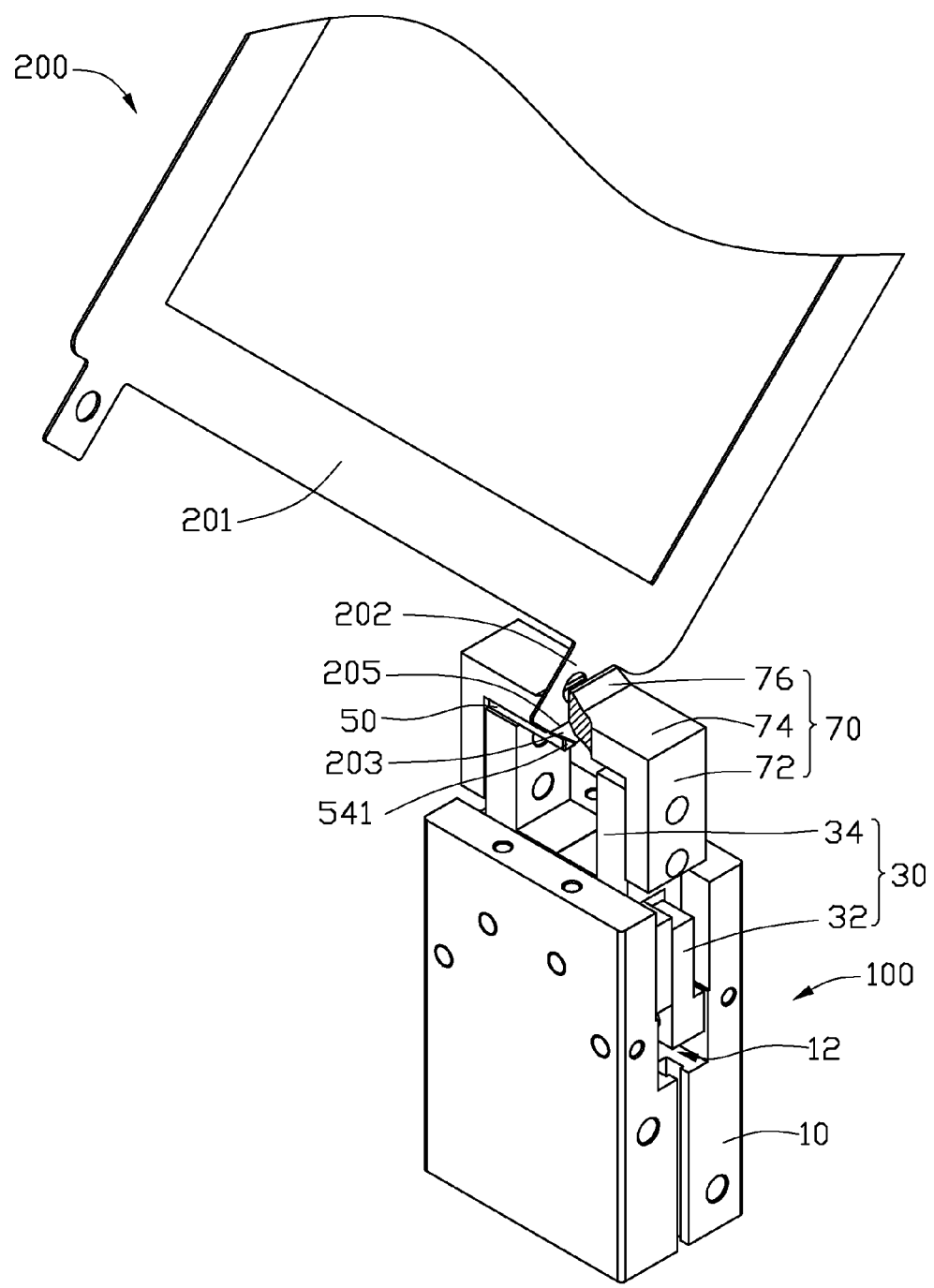
FIG. 2 is an isometric view of the peeling mechanism of FIG. 1 in a second operation status.
Figure 3:
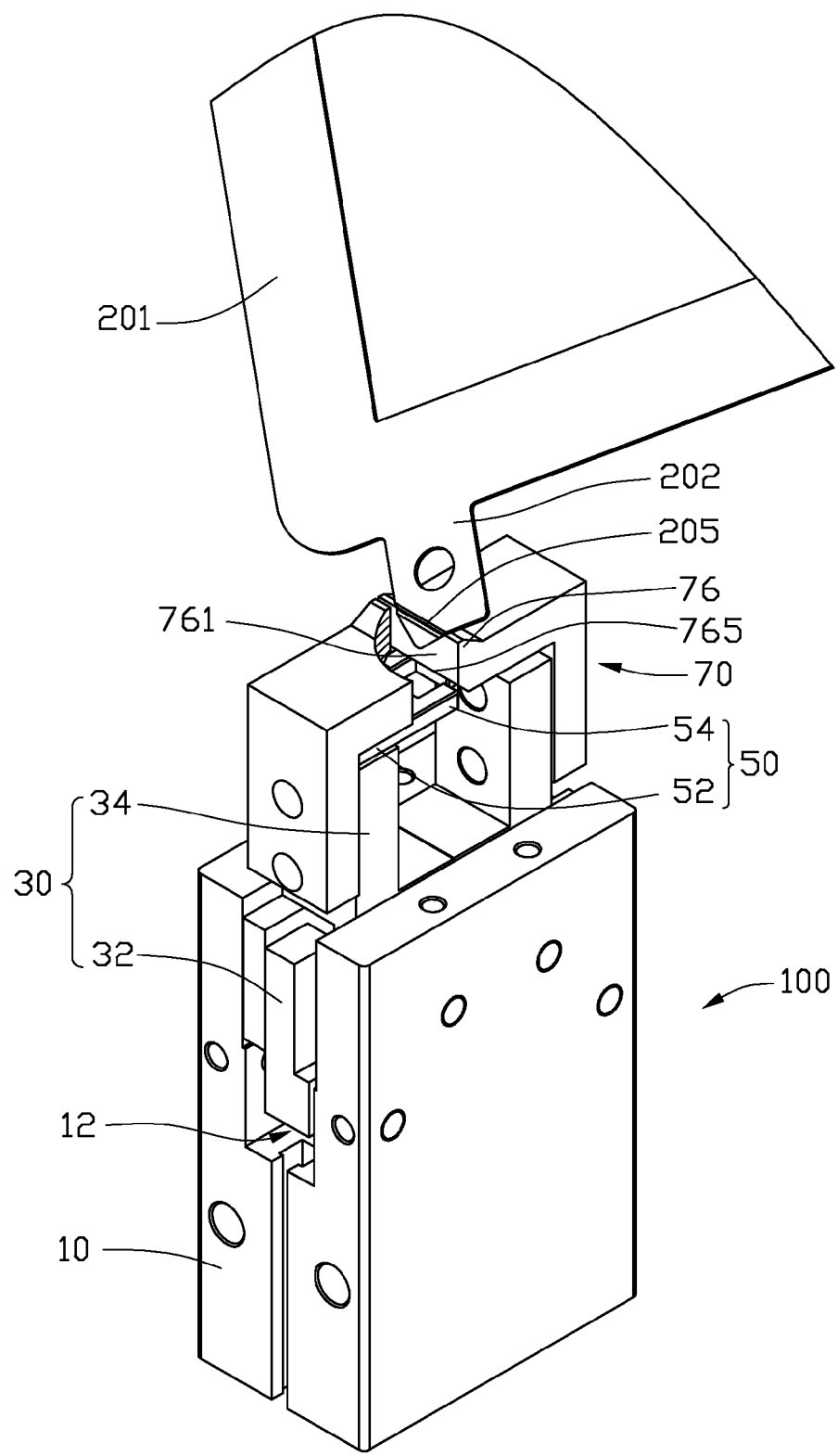
FIG. 3 is an isometric view of the peeling mechanism of FIG. 1 in a third operation status.

FIGS. 1-3 illustrate a first embodiment of a peeling mechanism 100. A peeling method can be carried out using the peeling mechanism 100 cooperating with a mechanical arm (not shown). The mechanical arm can drive the peeling mechanism 100 to remove a protecting film (not shown) pasted on a workpiece 200. The peeling mechanism 100 can include a base 10, a driver 30 mounted on the base 10, two cutting members 50 and two clamping members 70 coupled to the driver 30.

The base 10 can be substantially a cylindrical block and define a receiving space 12 at an end thereof. The receiving space 12 can be configured to receive the driver 30.

Figure 4:
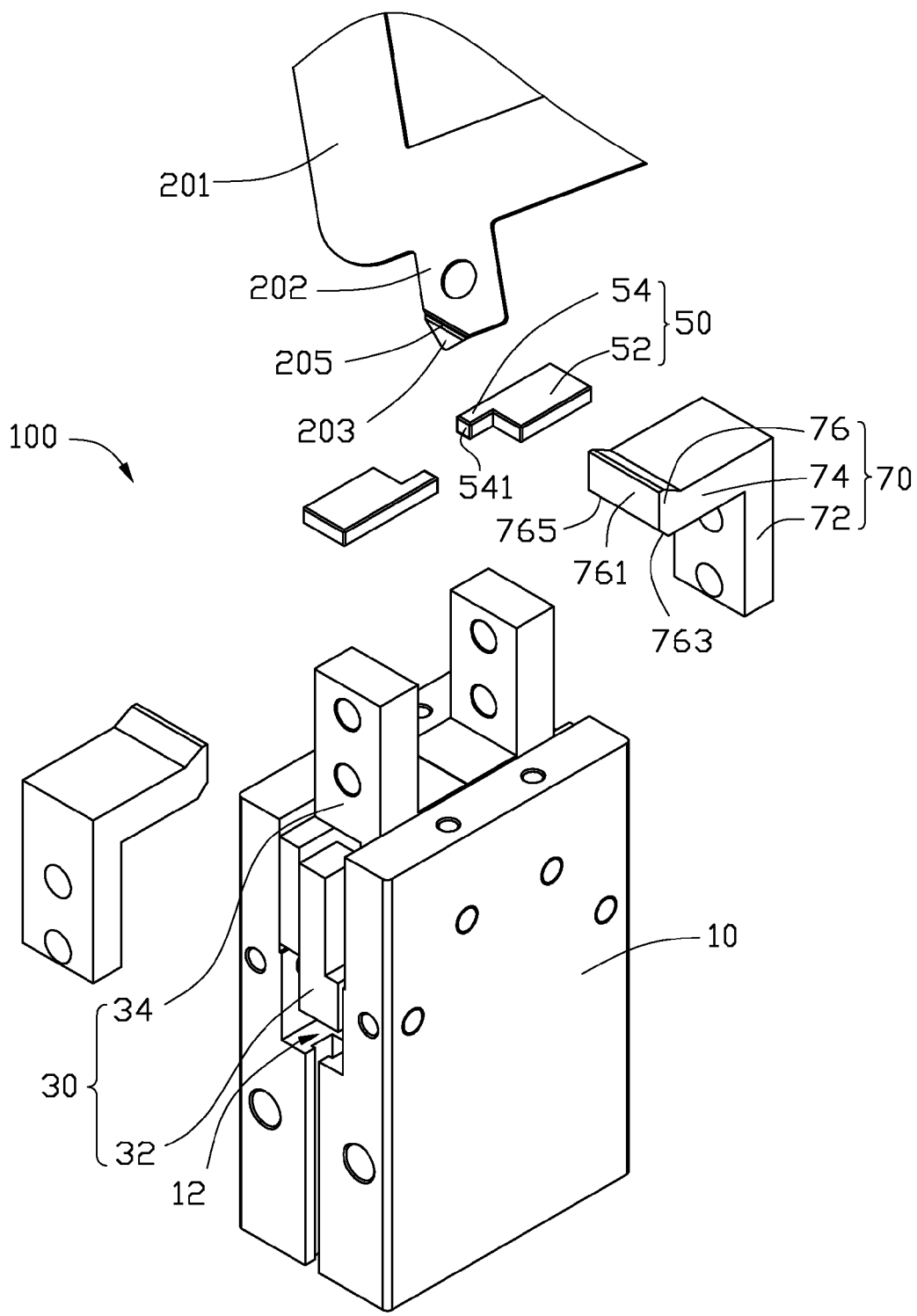
FIG. 4 is an explored, isometric view of the peeling mechanism of FIG. 3.

Referring to FIG. 4, the driver 30 can be mounted on the base 10 and received in the receiving space 12. The driver 30 can include a driving member 32 and two mounting portions 34 coupled to the driving member 32. The driving member 32 can be positioned and fixed on the base 10 and received in the receiving space 12. The two mounting portions 34 can be respectively mounted at opposite ends of the driving member 32 and protrude out of the receiving space 12. The mounting portions 34 can be parallel to each other. The driving member 32 can be configured to move the two mounting portions 34 close to or away from each other.

Figure 5:
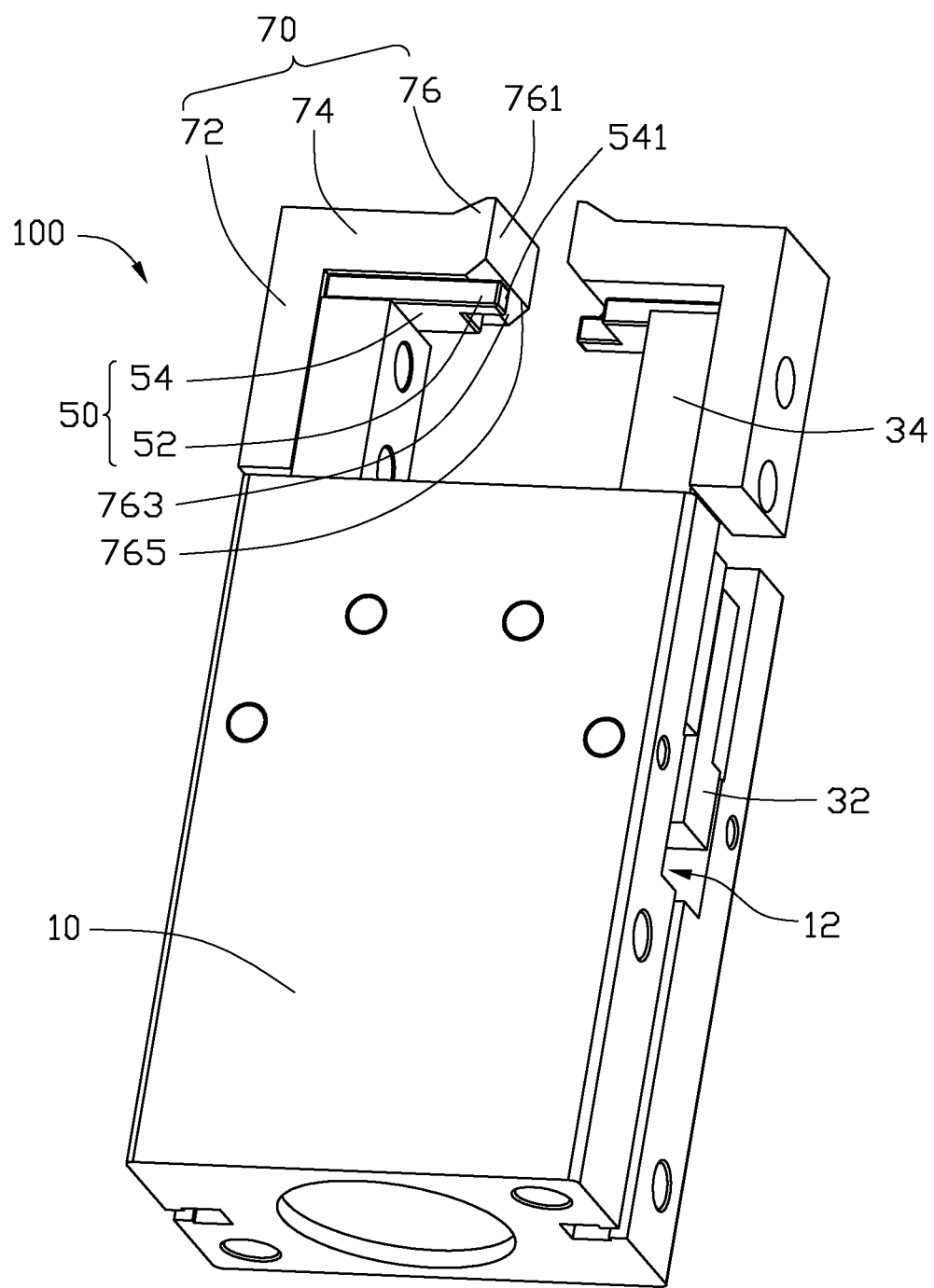
FIG. 5 is an isometric view of the peeling mechanism of FIG. 3, but viewed an alternate angle.

Referring to FIG. 5, the two cutting members 50 can be respectively mounted to the two mounting portions 34 and be parallel to each other. Each cutting member 50 can include a main body 52 and a protruding portion 54 formed on the main body 52 and extending towards the other cutting member 50. The main body 50 can be substantially a rectangular block and fixed at an end of the mounting portion 34 away from the driving member 32. The protruding portion 54 can protrude from an end of the main body 52. The protruding portion 54 can include an end surface 541 departing from the main body 52. The two protruding ends 54 of the two cutting members 50 can be arranged along two directions parallel to each other. The two end surfaces 541 of the two protruding ends 54 can be parallel but not face to each other.

The two clamping members 70 can be positioned and spaced from each other. Each clamping member 70 can be mounted to a mounting portion 34, and correspond to a cutting member 50 mounted on the corresponding mounting portion 34. The clamping member 70 can be substantially L-shaped, and can include a first main body 72 and a second main body 74 forming on the first main body 72. The first main body 72 can be mounted on the mounting portion 34. The second main body 74 can protrude from an end away from the driving member 32 of the first main body 72 and extend towards the other clamping member 70. The second main body 74 can be stacked on the cutting member 50 and positioned at a side of the cutting member 50 away from the mounting portion 34. The second main body 74 can include a resisting end 76 at an end away from the first main body 72. The resisting end 76 can include a resisting surface 761 parallel to the first main body 72. Two resisting surfaces 761 of the two clamping members 70 can be parallel to each other, and the end surfaces 541 can be positioned in front of the corresponding resisting surfaces 761. A corner of the resisting end 76 adjacent to the cutting member 60 can be cut off and define an inclined surface 763. The inclined surface 763 and the resisting surface 761 can intersect with each other and define a reference line 765.

In assembly, the driving member 32 can be mounted in the base 10. The mounting portions 34 can be coupled to the driving member 32, and the cutting members 50 and the clamping members 70 can be mounted to the mounting portions 34.

In at least one embodiment, the base 10 can be omitted. For example, the driving member 32 can be position on a workbench to fulfill the processing.

In at least one embodiment, the mounting portion 34 can be omitted. For example, the two clamping members 70 can be mounted on the driving member 32 and positioned opposite to each other. The two cutting members 50 can be coupled to the second main body 74 and adjacent to the driving main body 32. The protruding ends 54 can be positioned in front of the corresponding resisting surfaces 761. Such that the driving main body 32 can move the two clamping members 70 towards or away from each other, and move the two cutting members 50 towards or away from each other.

Figure 6:
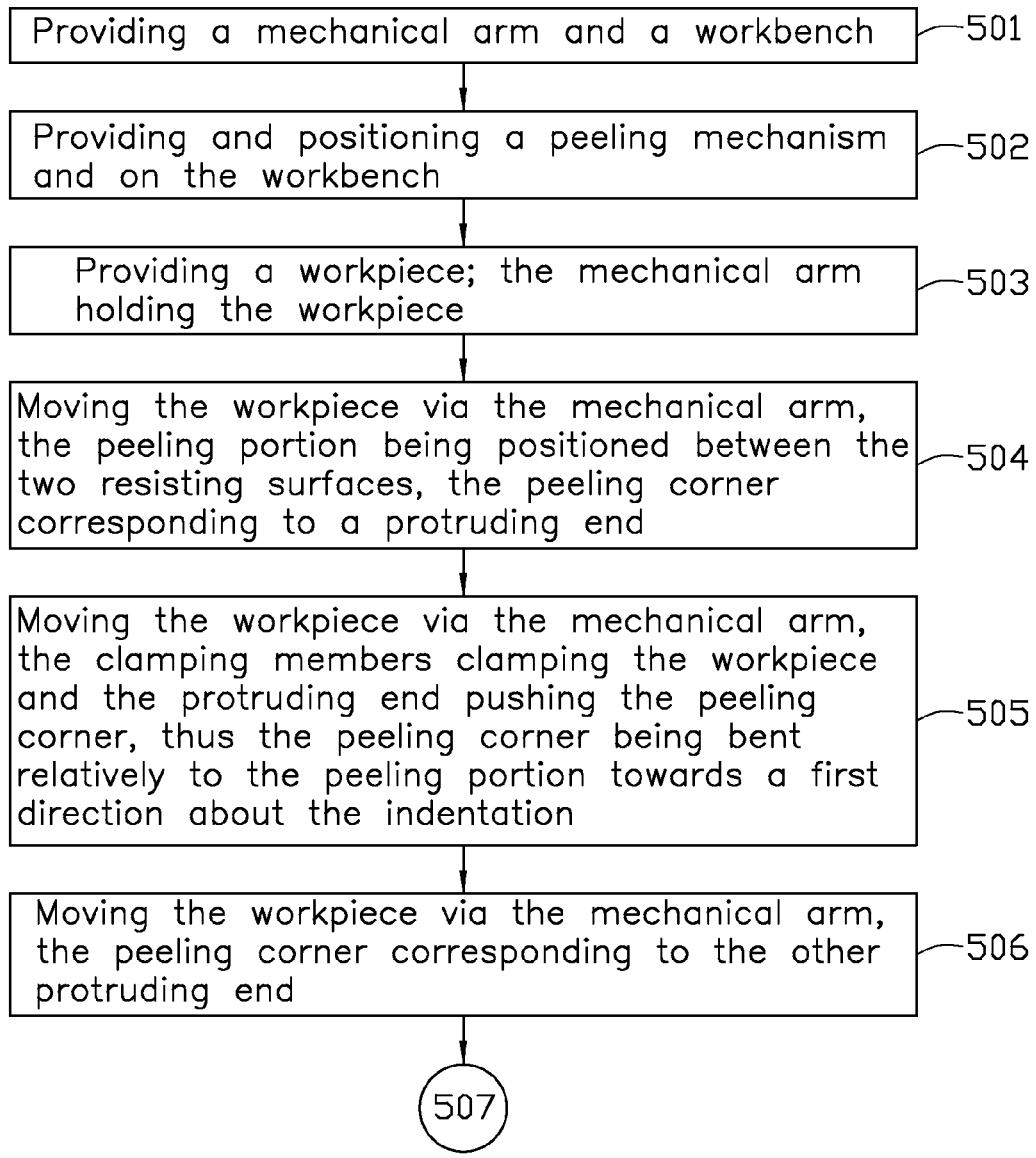
FIGS. 6-7 are a flowchart of a first embodiment of a peeling method.
Figure 7:
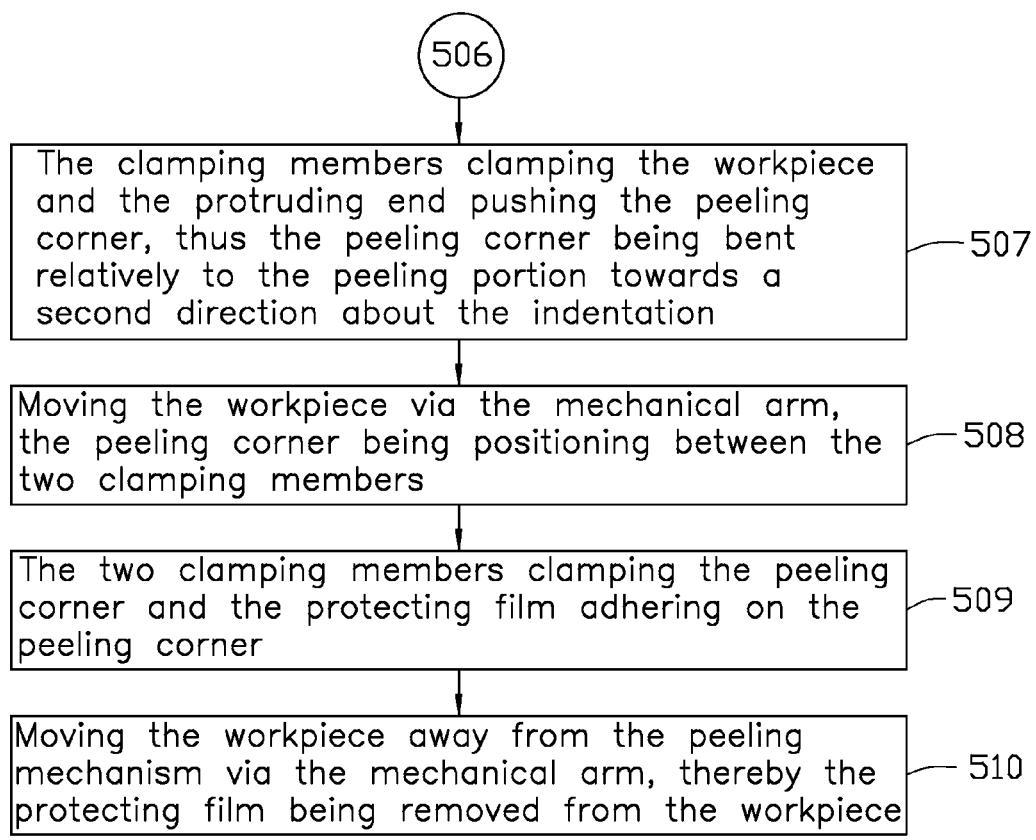

FIGS. 6 and 7 illustrate a flowchart in accordance with a first example embodiment. The first example method is provided by way of example, as there are a variety of ways to carry out the method. The method described below can be carried out using the configurations illustrated in FIGS. 1-5, for example, and various elements of these figures are referenced in explaining example method. Each block shown in FIG. 6 represents one or more processes, methods, or subroutines, carried out in the first example method. Additionally, the illustrated order of blocks is by example only and the order of the blocks can change. The first example method for removing a protecting film of the workpiece 200 can begin at block 501.

At block 501, a mechanical arm and a workbench can be provided. The mechanical arm can be positioned adjacent to the workbench.

At block 502, a peeling mechanism can be provided. The peeling mechanism can include a base, a driver mounted on the base, two cutting members and two clamping members coupled to the driver. The peeling mechanism can be positioned on the workbench and the cutting members and the clamping members can be away from the workbench.

At block 503, a workpiece 200 can be mounted and fixed on the mechanical arm. In the illustrated embodiment, the workpiece 200 can be substantially flaky and covered by a protecting film. The workpiece 200 can include a main portion 201 and a peeling portion 202 forming at a corner of the main portion 201. A corner of the peeling portion 202 can be punched to form a peeling corner 203. An indentation 205 can be defined between the peeling portion 202 and the peeling corner 203. A thickness of the indentation 205 can be thinner than the same of the peeling portion 202 and the peeling corner 203. Thus, a stress concentration can be occur at a portion around the indentation 205, and the peeling corner 203 can be easily broken off from the peeling portion 202.

At block 504, the mechanical arm can move the workpiece 200 and the peeling portion 202 can be driven to a position between the two resisting surfaces. And the indentation 205 can be parallel to the reference line, the peeling corner 203 can correspond to a protruding end.

At block 505, the driving member can drive the mounting portion to move the two cutting members closing to each other, and the two clamping members can be moved towards each other. The resisting surfaces can clamp the peeling portion 202, and the protruding end can resist against the peeling corner 203 simultaneously. The peeling corner 203 can be pushed to rotate about the indentation 205 in a first direction (shown in FIG. 1).

At block 506, the driving member can drive the mounting portion to move the two cutting members and the two clamping members back. The mechanical arm can move the workpiece 200 along the reference line, such that the peeling corner 230 can correspond to the other protruding end.

At block 507, the driving member can drive the mounting portion to move the two cutting members closing to each other, and the two clamping members can be moved towards each other. The resisting surfaces can clamp the peeling portion 202, and the corresponding protruding end can resist against the peeling corner 203 simultaneously. The peeling corner 203 can be pushed to rotate about the indentation 205 in a second direction (shown in FIG. 2) opposite to the first direction. The peeling corner 203 can be broken off from the peeling portion 202, and the protecting film can still adhere on the workpiece 200, such that the peeling corner 203 can be not separated from the peeling portion 202 temporarily.

At block 508, the driving member can drive the mounting portion to move the two cutting members and the two clamping members back. The mechanical arm can move the workpiece 200 and the peeling corner 203 can be driven to a position between the two resisting surfaces. The peeling corner 203 can be parallel to the resisting surfaces.

At block 509, the driving member can drive the mounting portion to move the two cutting members closer to each other, and the two clamping members can be moved towards each other. The resisting surfaces can clamp the peeling corner 203 and the protecting film adhering on the peeling corner 203 (shown in FIG. 3).

At block 510, the mechanical arm can move the workpiece 200 away from the peeling mechanism, causing the peeling portion 202 and the peeling corner 203 being separated from each other about the indentation 205. Because the peeling corner 203 and the protecting film adhering thereon is clamped by the clamping members, and the main portion 201 and the peeling portion 202 is moved away from the peeling corner 230, the protecting film adhering on the main portion 201 and the peeling portion 202 can be left with the protecting film adhering on the peeling corner 203. Thus, the protecting film adhering on the workpiece 200 can be removed. In at least one embodiment, the mechanical arm can be motionless, and the workbench can move the peeling mechanism away from the mechanical arm and the workpiece 200 hold on the mechanical arm such that the protecting film can be removed from the workpiece 200.

Figure 8:
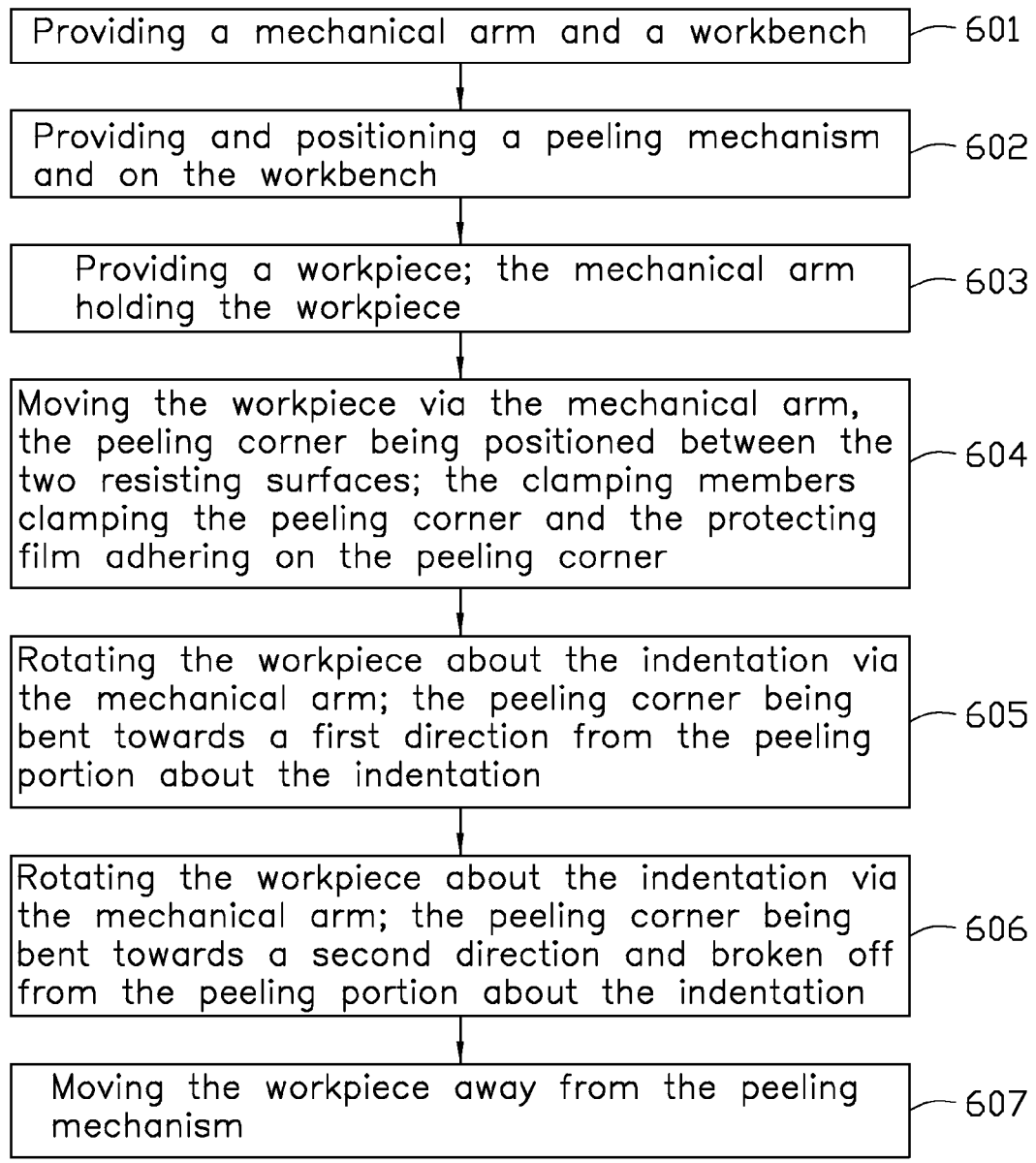
FIG. 8 is a flowchart of a second embodiment of a peeling method.

FIG. 8 illustrates a flowchart in accordance with a second example embodiment. The second example method is provided by way of example, as there are a variety of ways to carry out the method. The method described below can be carried out using the configurations illustrated in FIGS. 1-5, for example, and various elements of these figures are referenced in explaining example method. Each block shown in FIG. 7 represents one or more processes, methods, or subroutines, carried out in the first example method. Additionally, the illustrated order of blocks is by example only and the order of the blocks can change. The second example method for removing a protecting film of the workpiece 200 can begin at block 601.

At block 601, a mechanical arm and a workbench can be provided. The mechanical arm can be positioned adjacent to the workbench.

At block 602, a peeling mechanism can be provided. The peeling mechanism can include a base, a driver mounted on the base, and two clamping members coupled to the driver. The peeling mechanism can be positioned on the workbench and the clamping members can be away from the workbench.

At block 603, a workpiece 200 (shown in FIGS. 1-5) can be mounted and fixed on the mechanical arm. In the illustrated embodiment, the workpiece 200 can be substantially flaky and covered by a protecting film. The workpiece 200 can include a main portion 201 and a peeling portion 202 forming at a corner of the main portion 201. A corner of the peeling portion 202 can be punched to form a peeling corner 203. An indentation 205 can be defined between the peeling portion 202 and the peeling corner 203. A thickness of the indentation 205 can be thinner than the same of the peeling portion 202 and the peeling corner 203. Thus, a stress concentration can be occur at a portion around the indentation 205, and the peeling corner 203 can be easily broken off from the peeling portion 202.

At block 604, the mechanical arm can move the workpiece 200 towards the peeling mechanism, the peeling portion 202 can be driven to a position between the two resisting surfaces. The peeling portion 202 can be parallel to the resisting surfaces. The driving member can drive the mounting portion to move the two clamping members closing to each other. The clamping surfaces can clamp the peeling corner 203 and the protecting film adhering on the peeling corner 203.

At block 605, the mechanical arm can move the workpiece 200 to rotate about the indentation 205 in a first direction, causing the main portion 201 and the peeling portion 202 bending relative to the peeling corner 203 towards the first direction.

At block 606, the mechanical arm can move the workpiece 200 to rotate about the indentation 205 in a second direction opposite to the first direction, causing the main portion 201 and the peeling portion 202 bending relative to the peeling corner 203 towards the second direction. The peeling corner 203 can be broken off from the peeling portion 202, and the protecting film can still adhere on the workpiece 200, such that the peeling corner 203 can be not separated from the peeling portion 202 temporarily.

At block 607, the mechanical arm can move the workpiece 200 away from the peeling mechanism, causing the peeling portion 202 and the peeling corner 203 being separated from each other about the indentation 205. Because the peeling corner 203 and the protecting film adhered thereon are clamped by the clamping members, and the main portion 201 and the peeling portion 202 is moved away from the peeling corner 230, the protecting film adhering on the main portion 201 and the peeling portion 202 can be left with the protecting film adhering on the peeling corner 203. Thus, the protecting film adhering on the workpiece 200 can be removed. In at least one embodiment, the mechanical arm can be motionless, and the workbench can move the peeling mechanism away from the mechanical arm and the workpiece 200 hold on the mechanical arm. Such that the protecting film can be removed from the workpiece 200.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A peeling mechanism configured to cooperate with a mechanical arm to remove a protecting film from a workpiece, the workpiece comprising a main portion, a peeling portion forming on the main portion, and a peeling corner forming on the peeling portion; an indentation defined between the peeling portion and the peeling corner; the workpiece being held on the mechanical arm; the peeling mechanism comprising:
 a driver;
 a pair of clamping members coupled to the driver and spaced from each other; and
 a pair of cutting members respectively coupled to the clamping members and positioned opposite to each other; each cutting member comprising:
  a protruding end extending towards the other cutting member; wherein the protruding end protrudes out of the clamping member, wherein the driver is configured to move the two clamping members towards each other and clamp the peeling portion, and one of the two protruding ends is configured to push the peeling corner, thus the peeling corner is bent and broken off from the peeling portion about the indentation; the clamping members are configured to clamp the peeling corner and the protecting film adhered on the peeling corner, the mechanical arm is configured to move the main portion away from the peeling mechanism to remove the protecting film from the workpiece.

2. The peeling mechanism of claim 1, wherein the driver comprises a driving member and two mounting portions coupled to opposite sides of the driving member; each clamping member is coupled to a mounting portion; the driving member is configured to mover the two mounting portions towards or away from each other, causing the two clamping members moving towards or away from each other.

3. The peeling mechanism of claim 2, wherein each clamping member comprises a first main body coupled to the mounting portion and a second main body forming on the first main body; the second main body protrudes from an end away from the driving member of the first main body and extends towards the other clamping member; the cutting member is coupled to a side of the second main body adjacent to the driver.

4. The peeling mechanism of claim 3, wherein each cutting member comprises a main body coupled to the mounting portion; the protruding end protrudes from the main body and comprises an end surface; the two end surfaces of the two protruding ends are parallel to each other.

5. The peeling mechanism of claim 4, wherein the second main body defines a resisting end at an end away from the first main body; the resisting end comprises a resisting surface parallel to the first main body; two resisting surfaces of the two clamping member are parallel to each other, and the end surfaces are positioned in front of the corresponding resisting surfaces.

6. The peeling mechanism of claim 5, wherein a corner of the resisting end adjacent to the cutting member is cut off and defines an inclined surface; the inclined surface and the resisting surface intersect with each other and define a reference line.

7. The peeling mechanism of claim 1, wherein the peeling mechanism further comprises a base defining a receiving space thereon; the driver is positioned on the base and received in the receiving space.

8. A peeling method comprising:
 providing a mechanical arm and a workbench adjacent to the mechanical arm;
 providing a peeling mechanism of claim 1, positioning the peeling mechanism on the workbench;
 providing a workpiece with a protecting film adhering, the workpiece comprising a main portion, a peeling portion forming on the main portion, and a peeling corner forming on the peeling portion; an indentation defining between the peeling portion and the peeling corner; mounting the workpiece to the mechanical arm;
 moving the workpiece via the mechanical arm, the peeling portion being positioned between the two resisting surfaces, the peeling corner corresponding to a protruding end, and the protruding end pushing the peeling corner, thus the peeling corner being bent relatively to the peeling portion towards a first direction about the indentation;
 moving the workpiece via the mechanical arm, the peeling corner corresponding to the other protruding end; the protruding end pushing the peeling corner, thus the peeling corner being bent and broken off from the peeling portion towards a second direction about the indentation;
 moving the workpiece via the mechanical arm, the two clamping members clamping the peeling corner and the protecting film adhering on the peeling corner; and
 moving the workpiece away from the peeling mechanism via the mechanical arm, thereby the protecting film being removed from the workpiece.

9. A peeling method comprising:
 providing a mechanical arm and a workbench adjacent to the mechanical arm;
 providing and positioning a peeling mechanism on the workbench, the peeling mechanism comprising a driver and two clamping members coupled to the driver; the two clamping members being spaced from each other, the driver configured to move the two clamping members towards or away from each other;
 providing a workpiece with a protecting film adhering, the workpiece comprising a main portion, a peeling portion forming on the main portion, and a peeling corner forming on the peeling portion; an indentation defining between the peeling portion and the peeling corner; mounting the workpiece to the mechanical arm;
 moving the workpiece via the mechanical arm, the peeling corner being positioned between the two clamping members; the clamping members clamping the peeling corner and the protecting film adhering on the peeling corner;
 rotating the workpiece about the indentation via the mechanical arm; the peeling corner being bent and broken off from the peeling portion about the indentation; and
 moving the workpiece away from the peeling mechanism via the mechanical arm, thereby the protecting film being removed from the workpiece.

* * * * *